(12) United States Patent
Johnston

(10) Patent No.: US 12,297,709 B2
(45) Date of Patent: May 13, 2025

(54) TOOL FOR SEVERING A DOWNHOLE TUBULAR BY A STREAM OF COMBUSTION PRODUCTS

(71) Applicant: SPEX Corporate Holdings Ltd., Aberdeen (GB)

(72) Inventor: Sidney Dantuma Johnston, Aberdeen (GB)

(73) Assignee: SPEX CORPORATE HOLDINGS LTD., Aberdeen (GB)

( * ) Notice: Subject to any disclaimer, the term of this patent is extended or adjusted under 35 U.S.C. 154(b) by 0 days.

(21) Appl. No.: 16/302,199

(22) PCT Filed: May 18, 2017

(86) PCT No.: PCT/GB2017/051390
§ 371 (c)(1),
(2) Date: Nov. 16, 2018

(87) PCT Pub. No.: WO2017/199037
PCT Pub. Date: Nov. 23, 2017

(65) Prior Publication Data
US 2019/0284892 A1    Sep. 19, 2019

(30) Foreign Application Priority Data

May 18, 2016   (GB) ...................................... 1608760
May 19, 2016   (GB) ...................................... 1608843
(Continued)

(51) Int. Cl.
*E21B 29/02*    (2006.01)
*E21B 47/06*    (2012.01)

(52) U.S. Cl.
CPC .............. *E21B 29/02* (2013.01); *E21B 47/06* (2013.01)

(58) Field of Classification Search
CPC ................................ E21B 29/02; E21B 47/06
See application file for complete search history.

(56) References Cited

U.S. PATENT DOCUMENTS 2,680,486 A    6/1954   Car[Enter
3,053,182 A *  9/1962   Christopher .............. B26F 3/04
                                                   102/307
(Continued)

FOREIGN PATENT DOCUMENTS

WO    2010/019252 A1    2/2010
WO    2013/066340 A1    5/2013
(Continued)

OTHER PUBLICATIONS

PCT International Search Report for corresponding PCT Application Serial No. PCT/GB2017/051390, mailed Sep. 1, 2017, pp. 1-3.
(Continued)

*Primary Examiner* — Robert E Fuller
*Assistant Examiner* — Neel Girish Patel
(74) *Attorney, Agent, or Firm* — Tarolli, Sundheim, Covell & Tummino LLP

(57) ABSTRACT

A tool for manipulating a tubular in a downhole environment is described. The tool comprises a housing defining a chamber, the chamber having at least one outlet, a propellant source located within the chamber an ignition mechanism for igniting the propellant source; and a control mechanism. Upon ignition of the propellant source, the propellant source is operable to deflagrate, creating at least one stream of combustion products, the chamber directing the/each stream of combustion products through the/each outlet, towards the tubular to be manipulated, at least one parameter of the/each stream of combustion products being changeable by the control mechanism.

29 Claims, 10 Drawing Sheets

(30) Foreign Application Priority Data

May 26, 2016 (GB) .................................... 1609261
May 26, 2016 (GB) .................................... 1609361

(56) References Cited

U.S. PATENT DOCUMENTS

| | | | | |
|---|---|---|---|---|
| 3,318,395 | A * | 5/1967 | Messmer | E21B 29/02 175/14 |
| 3,468,386 | A * | 9/1969 | Johnson | E21B 43/11 166/100 |
| 6,024,169 | A | 2/2000 | Haugen | |
| 6,076,602 | A | 6/2000 | Gano et al. | |
| 6,520,258 | B1 * | 2/2003 | Yang | E21B 43/117 166/55 |
| 7,640,986 | B2 * | 1/2010 | Behrmann | E21B 43/117 89/7 |
| 7,810,569 | B2 * | 10/2010 | Hill | E21B 43/2605 166/55.2 |
| 8,167,044 | B2 * | 5/2012 | Huang | E21B 43/117 102/306 |
| 8,685,187 | B2 * | 4/2014 | Han | F42B 1/02 149/109.2 |
| 8,726,809 | B2 * | 5/2014 | Walton | F42B 1/02 102/306 |
| 9,360,222 | B1 * | 6/2016 | Collier | F24B 1/028 |
| 2003/0183113 | A1 * | 10/2003 | Barlow | F42B 1/028 102/476 |
| 2004/0050466 | A1 * | 3/2004 | Kneisl | C06B 45/105 149/19.3 |
| 2004/0084189 | A1 * | 5/2004 | Hosie | E21B 47/10 166/66 |
| 2005/0056459 | A1 * | 3/2005 | Haney | E21B 43/117 175/4.6 |
| 2006/0070739 | A1 * | 4/2006 | Brooks | E21B 43/263 166/299 |
| 2006/0185839 | A1 * | 8/2006 | Tiernan | E21B 43/263 166/63 |
| 2006/0237190 | A1 * | 10/2006 | Snider | E21B 43/263 166/299 |
| 2008/0217022 | A1 * | 9/2008 | Deans | H04J 99/00 166/338 |
| 2008/0271894 | A1 * | 11/2008 | Hill | E21B 43/117 166/308.1 |
| 2009/0008078 | A1 * | 1/2009 | Patel | E21B 41/0035 166/313 |
| 2009/0223668 | A1 * | 9/2009 | Smart | F42D 3/04 166/299 |
| 2010/0000789 | A1 * | 1/2010 | Barton | E21B 43/11852 175/2 |
| 2010/0258292 | A1 * | 10/2010 | Tiernan | E21B 43/117 166/63 |
| 2010/0258353 | A1 * | 10/2010 | Lowry | E21B 21/002 175/69 |
| 2013/0255969 | A1 * | 10/2013 | Olsen | E21B 19/086 166/66 |
| 2014/0008129 | A1 * | 1/2014 | Jelsma | E21B 29/002 175/73 |
| 2014/0027126 | A1 * | 1/2014 | Aakre | E21B 43/12 166/373 |
| 2014/0034315 | A1 | 2/2014 | Tallini et al. | |
| 2014/0238678 | A1 * | 8/2014 | Arrell, Jr. | F42B 1/00 102/292 |
| 2014/0262328 | A1 | 9/2014 | Robertson | |
| 2014/0299322 | A1 * | 10/2014 | Underdown | E21B 43/116 166/55 |
| 2015/0129230 | A1 * | 5/2015 | Carlson | E21B 43/263 166/308.1 |
| 2015/0239795 | A1 * | 8/2015 | Doud | E21B 29/02 149/7 |
| 2016/0003035 | A1 * | 1/2016 | Logan | H04B 3/54 340/854.6 |
| 2017/0241227 | A1 * | 8/2017 | Tallini | C06B 33/02 |
| 2017/0335646 | A1 * | 11/2017 | Huang | E21B 43/114 |
| 2018/0120066 | A1 * | 5/2018 | Khatiwada | E21B 23/065 |
| 2019/0292853 | A1 * | 9/2019 | Woolston | E21B 7/06 |
| 2020/0063525 | A1 * | 2/2020 | Frazier | E21B 43/123 |
| 2022/0003043 | A1 * | 1/2022 | Nanayakkara | E21B 7/10 |
| 2022/0042396 | A1 * | 2/2022 | Tiwari | E21B 34/08 |
| 2022/0056763 | A1 * | 2/2022 | Russell | E21C 37/005 |

FOREIGN PATENT DOCUMENTS

| | | |
|---|---|---|
| WO | 2016/079512 A1 | 5/2016 |
| WO | 2016/139481 A1 | 9/2016 |
| WO | 2016/166531 A2 | 10/2016 |

OTHER PUBLICATIONS

Classification of Explosives, https://www.phmsa.dot.gov/hazmat/documents/approval/0_EX2016050296_2016050681.pdf/4205466, dated May 1, 2020.

Classification of Explosives, https://www.phmsa.dot.gov/hazmat/documents/approval/1_EX2019122535_2019125096.pdf/ApprovalsExplosives_107947_EX-Approval-736ea94f-d6d5-46aa-b216-8b6fef283e56, dated Nov. 23, 2016.

* cited by examiner

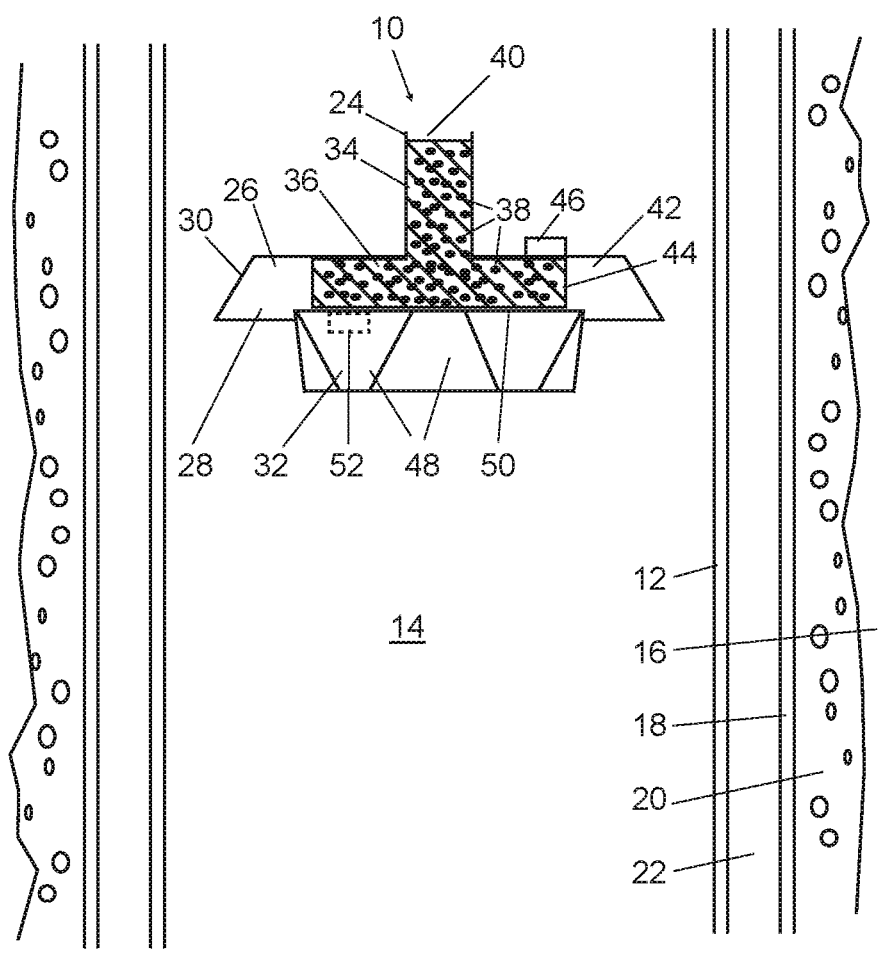
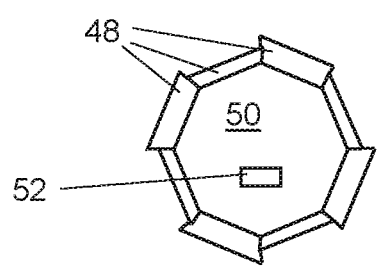
Fig 1
Fig 2

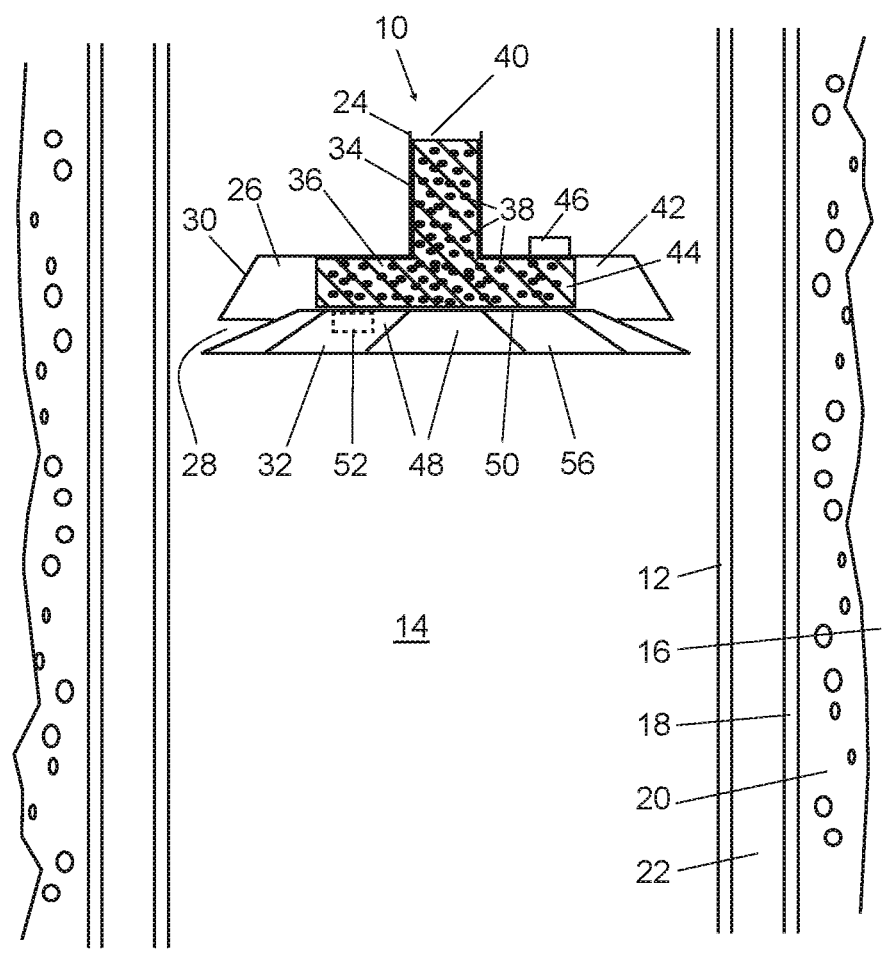
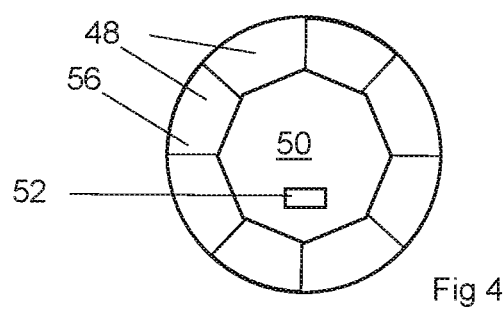
Fig 3
Fig 4

TOOL FOR SEVERING A DOWNHOLE TUBULAR BY A STREAM OF COMBUSTION PRODUCTS

RELATED APPLICATIONS

The present invention is a U.S. National Stage under 35 USC 371 patent application, claiming priority to Serial No. PCT/GB2017/051390, filed on 18 May 2017; which claims priority from 1608760.3, filed 18 May 2016, 1608843.7, filed 19 May 2016, 1609261.1, filed 26 May 2016, and 1609361.9, filed 26 May 2016, all of which are incorporated herein by reference.

FIELD OF THE INVENTION

The present invention relates to the field of manipulation of a material. The present invention finds particular application in the oil and gas industry and is particularly suitable for the manipulation of solid materials.

BACKGROUND TO THE INVENTION

There are situations in which it is desirable to initiate a change in the target material particularly in remote locations such as inside an oil or gas well. The change may be a change to one or more of temperature, structure, position, composition, phase, physical properties, chemical properties and/or condition of the target or any other characteristic of the target.

A typical situation may be to sever a tubular in a well, clean a downhole device or tubulars, initiate a downhole tool or remove an obstruction.

Conventional tools perform these operations with varying degrees of success but generally they are not particularly efficient and make such operations expensive and time consuming. They may, additionally, have associated ancillary equipment that is cumbersome or may attract stricter logistical or regulatory controls.

SUMMARY OF THE INVENTION

According to a first aspect of the present invention there is provided a tool for manipulating a tubular in a downhole environment, the tool comprising:
  a housing defining a chamber, the chamber having at least one outlet;
  a propellant source located within the chamber;
  an ignition mechanism for igniting the propellant source; and
  a control mechanism;
  wherein upon ignition of the propellant source, the propellant source is operable to deflagrate, creating at least one stream of combustion products, the chamber directing the/each stream of combustion products through the/each outlet, towards the tubular to be manipulated, at least one parameter of the/each stream of combustion products being changeable by the control mechanism.

In at least one embodiment of the invention, a tool is provided which uses a stream of combustion products created by combustion of a propellant source to manipulate a tubular by, for example, ablation, cutting, displacement, removal, heating, abrasion, or erosion. This method is much faster than conventional processes leading to time and resource savings, and associated reduced costs. The stream of combustion products can be controlled, for example, to cut to a particular depth, with a particular intensity, in a particular direction etc.

The propellant source may comprise at least one propellant.

The propellant source may comprise a plurality of propellants.

Where there are a plurality of propellants, there may be a plurality of different types of propellant.

A propellant is an explosive material which has a low rate of combustion and once ignited burns or otherwise decomposes to produce propellant gas. This gas is highly pressurised, the pressure driving the gas and other combustion products away from the propellant, forming a stream of combustion products. A propellant can burn smoothly and at a uniform rate after ignition without depending on interaction with the atmosphere, and produces propellant gas and/or heat on combustion and may also produce additional combustion products.

In one embodiment, the control mechanism may act directly on the/each stream of combustion products. For example, the control mechanism may apply an electric field to the/each stream of combustion products to create an ionised stream.

The control mechanism may act indirectly on the/each stream of combustion products by acting on the tool. For example, the control mechanism may open or close the outlet to focus or disperse the/each stream of combustion products.

Alternatively or additionally, the control mechanism may act indirectly on the/each stream of combustion products by acting on a feature of the environment surrounding the tool. For example, the control mechanism may apply a magnetic field to a portion of the tubular to divert the/each stream of combustion products towards or away from the portion of the tubular.

In some embodiments, the parameter which may be changed by the control mechanism may be the content or structure of the/each stream of combustion products.

The control mechanism may be operable to ionise the/each stream of combustion products.

The/each stream of combustion products may be ionised by the application of a magnetic field.

The tool may be operable to ionise the/each stream of combustion products. Ionising the/each stream of combustion products makes it susceptible to manipulation by electromagnetic fields, for example.

The/each stream of combustion products may be at least partially ionised by at least part of the/each stream of combustion products coming into contact with an electrical arc.

The/each stream of combustion products may be ionised by passing through an induction coil.

In other embodiments the/each stream of combustion products may be ionised by the application of pulsed eddy currents, microwave radiation, an electro-magnetic field or the like.

The/each stream of combustion products may comprise solids, liquids and gases.

In some embodiments the/each stream of combustion products may further comprise plasma alone or in combination with gases, liquids and/or solids. Whilst not wishing to be bound by theory, it is believed that environmental temperature and pressure conditions can be sufficient to generate plasma from the solids and gases of the combustion products.

The plasma may be generated by the deflagration of the propellant. Generation of plasma from propellant can occur if the temperature and pressure conditions are correct.

The tool may further comprise a source of heat for generating the/each stream of combustion products comprising plasma. By heating the combustion products generated by the deflagration of the propellant, a plasma can be formed. Plasma can be utilised for effective ablation, cutting, displacement, removal, heating, abrasion, or erosion of the target.

The source of heat may be contained in the chamber.

The control mechanism may introduce oxygen to enhance the burning of the propellant or the tubular to be manipulated. In some embodiments, the tubular to be manipulated itself can become a fuel source. Where the tubular to be manipulated is predominantly iron, the introduction of oxygen and heat can create an exothermic chemical reaction between the iron and oxygen to form iron oxides.

The control mechanism may control the rate of burn of propellant or the volume of supply of propellant.

The control mechanism may control the type of propellant.

The control mechanism may control the constitution of the propellant source.

Alternatively or additionally, the parameter which may be changed by the control mechanism may be the dimensions or the direction of the/each stream of combustion products.

The/each outlet may define an opening.

The control mechanism may be operable to vary the outlet opening.

The tool may be operable to vary the opening from an outlet closed position, in which the/each stream of combustion products is prevented from flowing through the/each outlet, to an outlet open position, in which the/each stream of combustion products disperses as it flows through the outlet.

The outlet opening may be defined by an outlet throat.

The outlet may comprise at least one nozzle.

The/each nozzle may be supersonic. A supersonic nozzle creates a build up of pressure within the chamber which allows the/each stream of combustion products to flow through the/each nozzle into the surrounding environment, irrespective of the environmental pressure of the surrounding environment.

The tool may be operable to move the/each outlet to an outlet focused position in which the outlet channels the/each stream of combustion products towards a particular location outwith the tool.

The tool may be operable to move the/each outlet mechanically.

In alternative embodiments, the tool may be operable to move the/each outlet by heat and/or cooling.

In this embodiment, the outlet may comprise a bimetallic material. A bimetallic material is moveable in response to temperature variations.

The tool may comprise a piezoelectric material. For example piezoelectric material could be used to create movement in the/each outlet.

Non-mechanical, hydraulic, electric or any suitable method of moving the outlet may be employed.

The outlet may comprise a number of outlet sections, the outlet sections being relatively moveable to vary the/each outlet opening.

The outlet sections may be overlapping petals.

The tool may further define at least one flow member, the/each flow member being operable to be engaged by the/each stream of combustion products, engagement with the/each flow member changing the dimensions of the/each stream of combustion products. The flow member may be operable to focus the/each stream of combustion products or to disperse the/each stream of combustion products.

The flow member may be an insert in the/each stream of combustion products.

The flow member may be positioned to disperse the/each stream of combustion products.

Alternatively or additionally, the flow member may be positioned to funnel the/each stream of combustion products.

Where the/each stream of combustion products is ionised, the tool may be operable to apply a magnetic field to the/each stream of ionised combustion products. A magnetic field can be used to focus a stream of ionised combustion products, impart thrust to or disperse or change direction of a stream of ionised combustion products.

The magnetic field may be applied by an electromagnetic source.

The tool may be operable to apply an electric field and/or microwave radiation to the/each stream of combustion products.

The tool may be adapted to pulse the/each stream of combustion products.

Where there are a plurality of propellants, they may be ignited simultaneously or sequentially.

Alternatively or additionally, the parameter which may be changed by the control mechanism may be the energy in the/each stream of combustion products.

The energy within the/each stream of combustion products may be increased by pressurising the/each stream of combustion products.

The tool may be operable to pressurise the/each stream of combustion products.

The/each stream of combustion products may be pressurised to a threshold pressure within the tool chamber. Pressurising the combustion products within the tool improves deflagration of the propellant and assists in the formation of a plasma. However, a threshold pressure needs to be chosen to prevent detonation of the propellant which may occur if the pressure at the location of the deflagration of the propellant is too high.

The energy within a stream of combustion products may be increased by combining a stream with at least one other stream of combustion products together.

The control mechanism may respond to a change in environmental conditions.

The control mechanism may comprise at least one sensor. The provision of sensors allows feedback to the tool, and particularly, to the control mechanism, permitting the control mechanism to adjust the parameter or parameters of the/each stream of combustion products to achieve a desired result.

The/each sensor may measure the pressure of the/each stream of combustion products. If the manipulation of the tubular is to sever the tubular, then there may, for example, be a pressure drop within the/each stream of combustion products when the/each stream of combustion products completes the cut through the tubular.

The/each sensor may measure the velocity of the/each stream of combustion products. Similarly, as in the previous example, there may be an increase in velocity of the stream upon achieving a cut.

The/each sensor may measure the capacitance or electric current in the tubular. When a tubular has been severed, the electrical current flowing through the tubular from one side of the cut to the other will cease, indicating to the control mechanism that the cut has been completed.

The/each sensor may measure the erosion and/or the rate of erosion of the material in the tubular. The erosion of the material is an indicator to the control mechanism concerning the progress of the operation being undertaken.

The/each sensor may measure the stress or strain in the tubular. The stress or strain in the tubular is a further indicator of progress of the operation.

The/each sensor may take sonar readings from the target.

The tool may further comprise at least one modifying agent provided in or adjacent to the tool or generated by the tool.

The control mechanism may control provision or formation of the/each modifying agent.

At least one modifying agent may be formed by the combustion of the propellant source or part of the propellant source.

Alternatively or additionally, at least one modifying agent may be formed separately from the combustion of the propellant source.

Alternatively or additionally, at least one modifying agent may be present prior to ignition of the propellant source.

At least one modifying agent may be contained within the propellant source. For example, the at least one modifying agent may be exposed as the propellant source combusts.

In at least one embodiment the control mechanism may introduce at least one modifying agent into the/each stream of combustion products.

In at least one embodiment of the present invention at least one modifying agent may include solid particles. Solid particles can cause abrasion of the material to be manipulated.

Alternatively or additionally at least one modifying agent may contain liquid droplets. Liquid droplets can cause erosion of the material to be manipulated.

The liquid droplets may be explosive and may explode on impact with the target. In at least one embodiment of the present invention explosive liquid droplets increase the penetrating power of the/each stream of combustion products and/or additional materials.

The modifying agent may become part of the/each stream of combustion products within the housing.

The modifying agent may become part of the/each stream of combustion products outwith the housing.

The control mechanism may be operable to control the depth of penetration of the/each stream of combustion products into the tubular.

The control mechanism may be operable to dump or disperse the/each stream of combustion products away from, or to minimise the effect of the stream on, the tubular.

The control mechanism may be operable to control a plurality of parameters of the/each stream of combustion products.

The control mechanism may be operable to control the parameters simultaneously.

Alternatively or additionally the control mechanism may be operable to control the parameters consecutively.

The control mechanism may be able to respond to multiple sensors.

The/each outlet may be sealed. Sealing the/each outlet prevents the ingress of fluid into the chamber.

The outlet sealing mechanism may be controlled by the control mechanism.

The outlet sealing mechanism may be operable to withstand the pressure within the chamber.

The outlet sealing mechanism may be operable to permit the opening of the outlets at a threshold pressure.

There may be other sealing mechanisms to prevent ingress through any opening in the tool, into the tool interior.

According to a second aspect of the present invention there is provided a tool for manipulating a target, the tool comprising:
 a housing defining a chamber, the chamber having at least one outlet;
 a propellant source located within the chamber;
 an ignition mechanism for igniting the propellant source; and
 a control mechanism;
 wherein, upon ignition of the propellant source, the propellant source is operable to deflagrate, creating at least one stream of combustion products, the chamber directing the/each stream of combustion products through the/each outlet, towards the target to be manipulated, at least one parameter of the/each stream of combustion products being changeable by the control mechanism.

The target may be a tubular.

The tubular may be located in a downhole environment.

Where the target defines a void, the tool may be able to manipulate an internal surface of the target.

In other embodiments, the tool may manipulate an external surface of the target.

The tool may be operable to direct the/each stream of combustion products in a radially outwards direction.

Alternatively or additionally, the tool may be operable to direct the/each stream of combustion products in a radially inwards direction.

The tool may be operable to remove material from a target by, for example, ablation, cutting, displacement, removal, heating, abrasion, or erosion.

It will be understood that preferred features and/or alternative features listed in connection with one aspect may be used with any other aspect and have not been repeated for brevity.

BRIEF DESCRIPTION OF THE DRAWINGS

Embodiments of the present invention will now be described with reference to the accompanying Figures in which:

FIG. 1 is a schematic section of a tool for manipulating a tubular, showing the lower outlet in a run-in or dump configuration, in accordance with a first embodiment of the present invention;

FIG. 2 is a bottom view of the lower outlet of the tool of FIG. 1 in the run-in or dump configuration;

FIG. 3 is a schematic section of the tool of FIG. 1, showing the lower outlet in the deployed configuration;

FIG. 4 is a bottom view of the lower outlet of the tool of FIG. 1 in the deployed configuration;

DETAILED DESCRIPTION OF THE DRAWINGS

Figure 5:
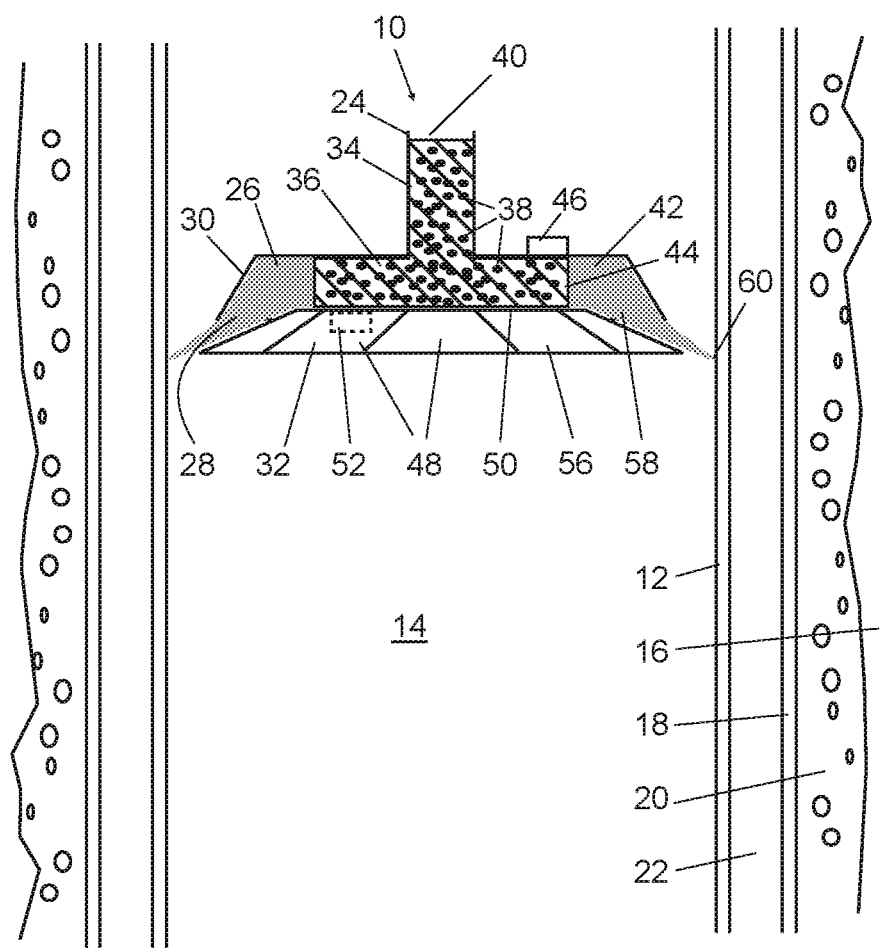
FIG. 5 is a schematic section of the tool of FIG. 1 showing the stream of combustion products engaging with the tubular.

Reference is first made to FIG. 1, a schematic section of a tool, generally indicated by reference numeral 10, for manipulating a tubular 12, in accordance with a first embodiment of the present invention.

The tool 10 is shown in a downhole location in a wellbore 14. The wellbore 14 has been drilled through bedrock 16 and a casing 18 has been adhered to the bedrock by cement 20. The tubular 12 which is to be cut by the tool 10 is spaced away from the casing 18; the tubular 12 and the casing 18 defining an annulus 22.

The tool 10 comprises a housing 24 defining a chamber 26, the chamber 26 having a circumferential outlet 28 defined by an upper outlet member 30 and a lower outlet member 32.

Located within the chamber 26 is a propellant source 34 containing a propellant 36, potassium perchlorate, and particles of a modifying agent 38, in this case silver, embedded in the potassium perchlorate. The propellant source 34 is fed through a vertical housing chamber 40 to a horizontal housing chamber 42; the propellant source 34 defining an ignition surface 44.

Adjacent to the ignition surface 44 is an ignition mechanism 46 operable to ignite the ignition surface 44 of the propellant source 34.

In FIG. 1, the lower outlet member 32 is in a run-in or dump configuration in which the maximum external diameter of the tool 10 is defined by the upper outlet member 30, and a flow of combustion products from the ignition surface 44 will flow through the circumferential outlet 28 and substantially down the wellbore 14.

Referring to FIGS. 1 and 2, the lower outlet member 32 comprises a series of overlapping petals 48 which are hingedly connected to a lower housing surface 50.

Mounted to the lower housing surface 50, and shown in broken outline on FIG. 1, is a control mechanism 52 which controls the movement of the lower outlet member petals 48 from the run-in or dump configuration shown in FIG. 1 to the deployed configuration shown in FIG. 3, thereby affecting the direction and intensity of a stream of combustion products flowing from the propellant source 34 towards the circumferential outlet 28.

In the deployed configuration, shown in FIG. 3, the petals 48 extend beyond the diameter described by the upper outlet member 30 into proximity with the tubular 12. The circumferential outlet 28 is now significantly smaller and, as will be shown, a stream of combustion products flowing from the propellant source 34 through the chamber 26 and out of the outlets 28, will be directed towards the tubular 12.

FIG. 4 shows a bottom view of the lower outlet member in the deployed configuration, in which the petals 48 overlap providing a continuous outlet surface 56.

FIG. 5 shows that the ignition mechanism 46 has ignited the ignition surface 44 and a stream of highly pressurised combustion products 58 is released. The stream of combustion products 58 is driven away from the propellant 36 due to the pressure within the stream 58 and, in particular, the pressure generated at the ignition surface 44. Within the stream of combustion products 58 are the particles 38 of molten silver which have been released from the propellant source 34.

The stream of combustion products 58 flows away from the propellant source 34 through the circumferential outlet 28 and into engagement with the tubular 12. The arrangement of the upper and lower outlet members serve to focus the stream of combustion products 58 to a very precise cutting edge 60. The combination of a hot propellant gas and molten silver carve into the casing 18, creating a precise cut.

Figure 6:
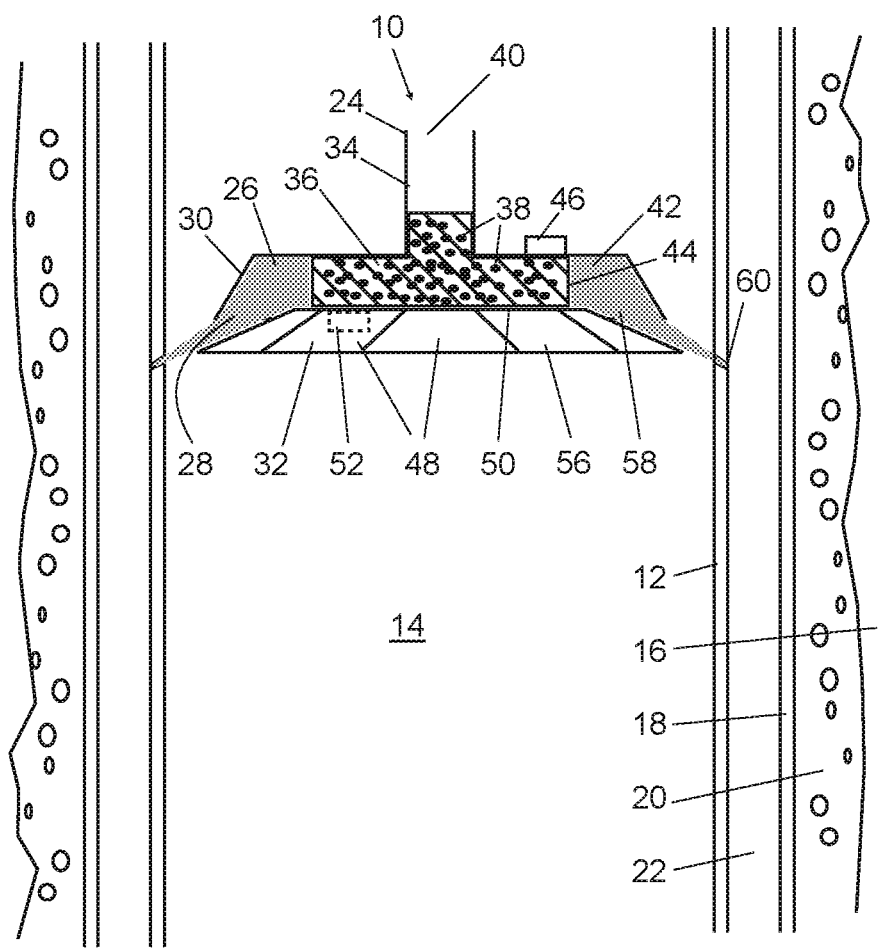
FIG. 6 is a schematic section of the tool FIG. 1, showing the stream of combustion products penetrating the tubular.

Reference is made to FIG. 6 in which the cutting edge 60 has virtually cut through the tubular 12. The volume of propellant source 34 in the horizontal housing chamber 42 is maintained by feeding the propellant source 34 in the vertical housing chamber 40 into the horizontal housing chamber 42. This maintains a constant position of the ignition surface 44 with respect to the tubular 12.

Figure 7:
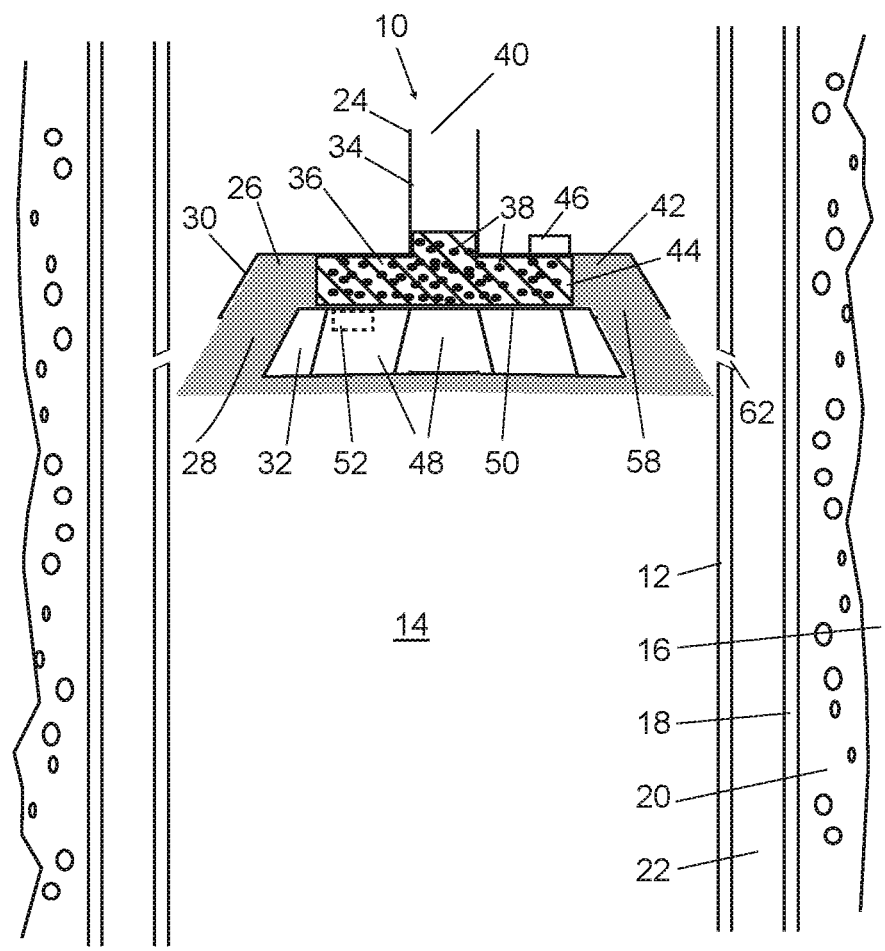
FIG. 7 is a schematic section of the tool FIG. 1 showing the stream of combustion products being dumped by the tool with the lower outlet of the tool moving to the run-in or dump configuration.

Referring to FIG. 7, once the tubular 12 is cut through, the pressure within the stream of combustion products 58 will drop as the stream flows through the opening 62 in the tubular 12. Pressure sensors inside the chamber 26 (not shown) detect this drop in pressure and this information is fed to the control mechanism 52. The control mechanism 52 moves the petals 48 of the lower outlet member 32 from the deployed configuration shown in FIGS. 4, 5 and 6 to the run in or dump configuration shown in FIG. 7 in which the stream of combustion products 58 is dispersed and sent substantially down the wellbore 14 to prevent further manipulation of the tubular 12.

Figure 8:
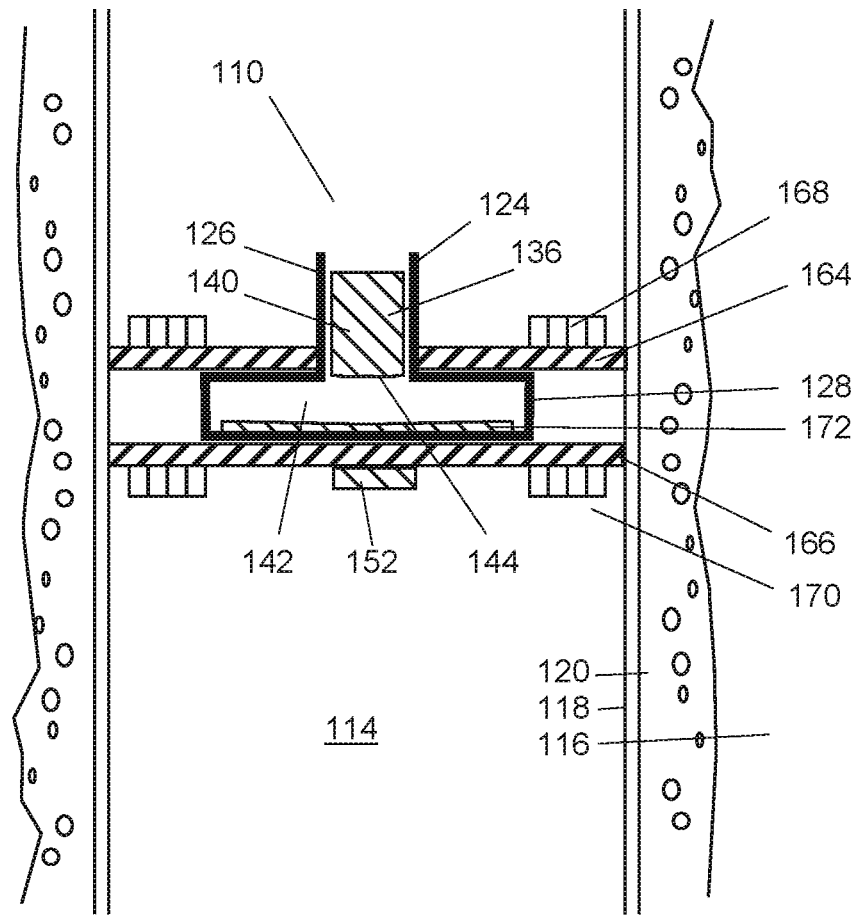
FIG. 8 is a schematic section of a tool for piercing a casing, in accordance with a second embodiment of the present invention.

Reference is now made to FIG. 8, a schematic section of the tool, generally indicated by reference numeral 110 for piercing a casing 118, in accordance with a second embodiment of the present invention.

Many of the features of the second embodiment are similar to the first embodiment and the associated reference numerals are incremented by 100.

The tool 110 is shown in a downhole location in a wellbore 114. The wellbore 114 has been drilled through bedrock 116 and the casing 118 has been adhered to the bedrock by cement 120.

The tool 110 comprises a housing 124 defining a chamber 126, having a vertical housing chamber 140 and a horizontal housing chamber 142. The vertical housing chamber 140 stores a propellant 136, ammonium perchlorate, the propellant 136 extends into the horizontal housing chamber 142 and defines an ignition surface 144 which, in use, is ignited by an ignition mechanism (not shown).

The horizontal housing chamber 142 defines a circumferential tool outlet 128. As shown in FIG. 8, the circumferential tool outlet 128 are sealed. This is to allow, in use, the pressure of the propellant gas, created during deflagration of the propellant 136, to build up within the chamber 126. The horizontal housing chamber 142 further comprises a heating element 172, the purpose of which will be discussed in due course.

The horizontal housing chamber 142 is sandwiched between two plates 164, 166 which are in contact with the casing 118.

Mounted to the plates 164, 166 is a control mechanism 152 and an upper electromagnet 168 and a lower electromagnet 170. The purpose of these electromagnets 168, 170 and the control mechanism 152 will now be discussed in connection with the operation of the tool 110.

With the tool 110 in position in the wellbore 114, as shown in FIG. 8, the control mechanism 152 establishes an electric circuit through the lower plate 166, casing 118, the upper plate 164 and the housing 124. The purpose of the circuit is to indicate to the control mechanism 152 that the casing 118 has been fully pierced back to bedrock around the full circumference of the casing 118 as the electric circuit will break.

Figure 9:
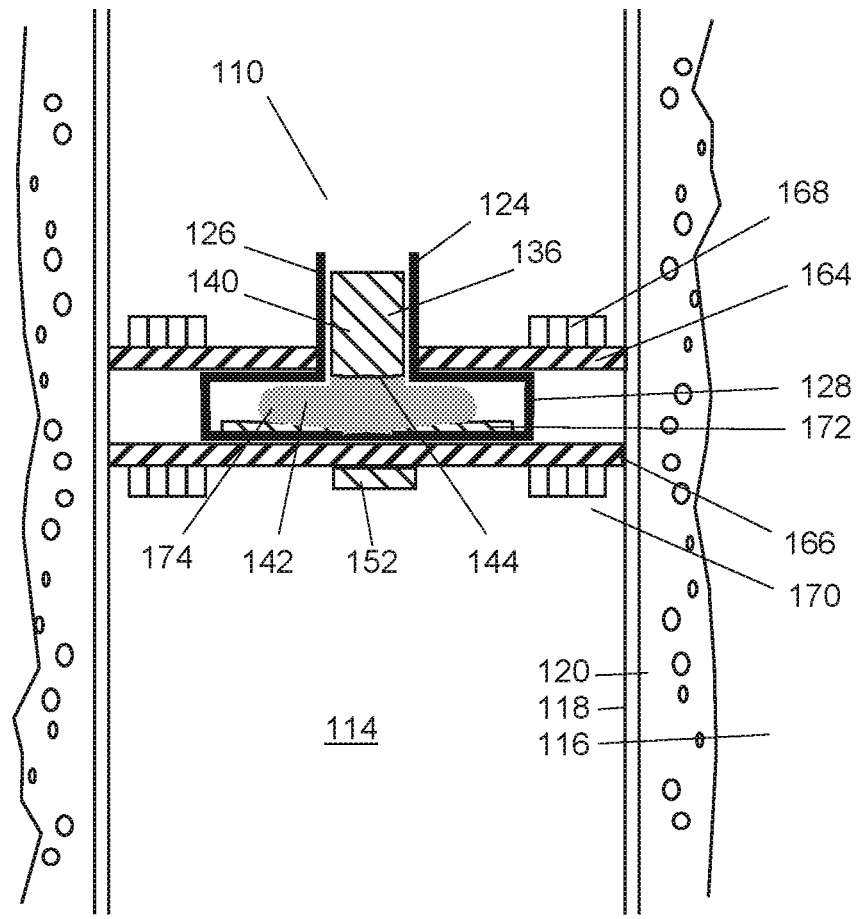
FIG. 9 is a schematic section of the tool FIG. 8 showing the propellant gas being converted into plasma.

Referring to FIG. 9, the ignition mechanism (not shown) ignites the propellant 136. The deflagration of the propellant 136 creates a cloud of combustion products 174 mostly comprising a propellant gas and a small amount of plasma within the sealed horizontal housing chamber 142. The heating element 172 heats this cloud of combustion products 174 and the combination of the temperature and associated rise in pressure within the horizontal housing chamber 142 turns the propellant gas into plasma.

Figure 10:
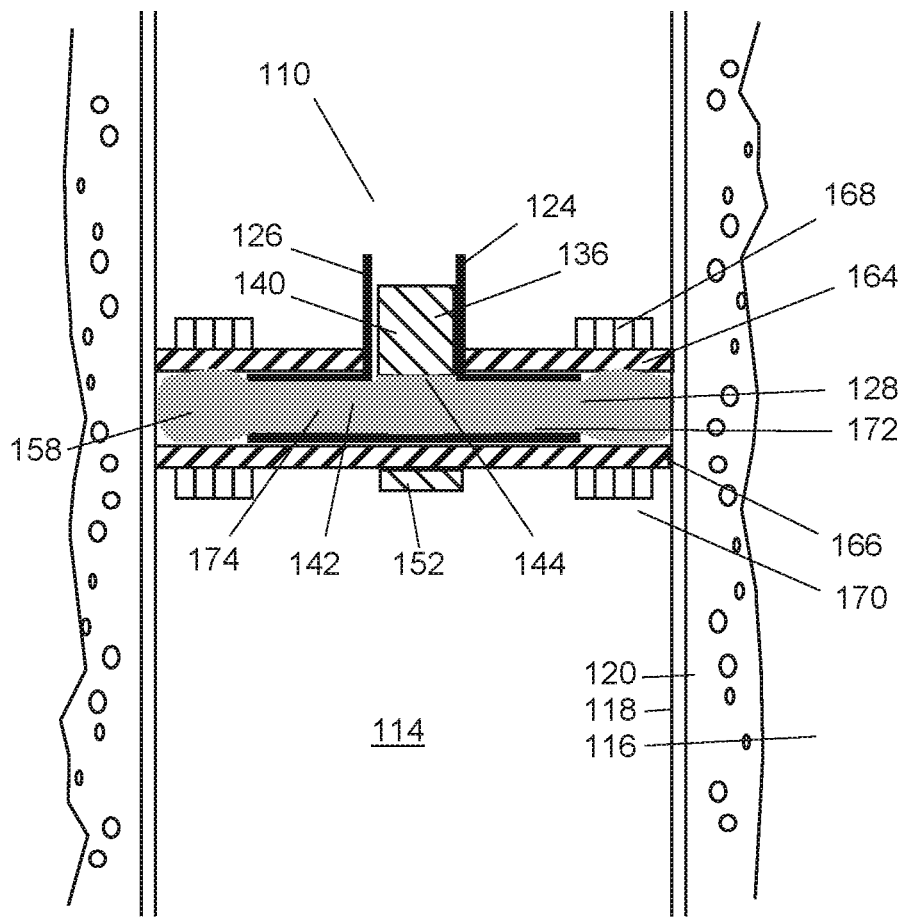
FIG. 10 is a schematic section of the tool FIG. 8 showing the stream of combustion products flowing towards the casing, pre-cutting.

Once a threshold pressure is reached, the seal on the circumferential tool outlet 128 ruptures allowing a stream of combustion products 158 to flow through the outlet towards the casing 118, as shown in FIG. 10.

Figure 11:
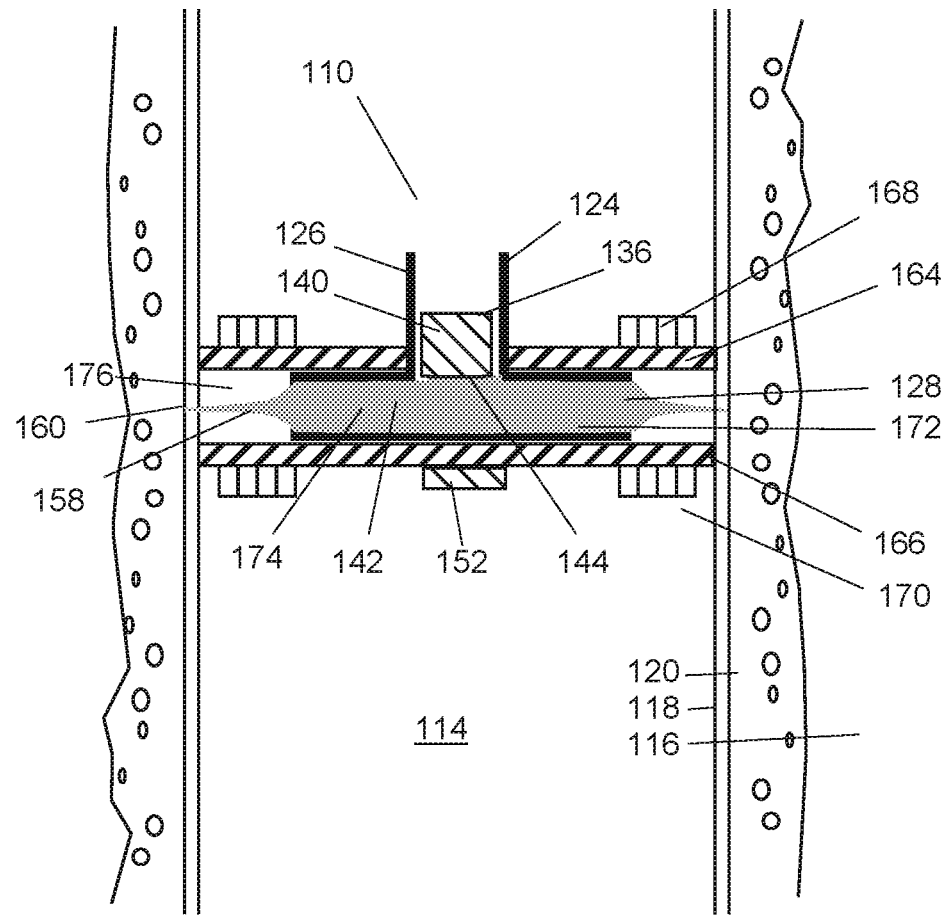
FIG. 11 is a schematic section of the tool FIG. 8 showing the stream of combustion products being focused and cutting the tubular.

Referring to FIG. 11, the electromagnets 168, 170, energised by the control mechanism 152, create an electric field in an annular void 176 between the circumferential tool outlet 128 and the casing 118. As can be seen from FIG. 11 the effect of this electromagnetic field is to focus the stream of combustion products 158 to form a cutting-edge 160 which will then perform a piercing of the casing 118.

Figure 12:
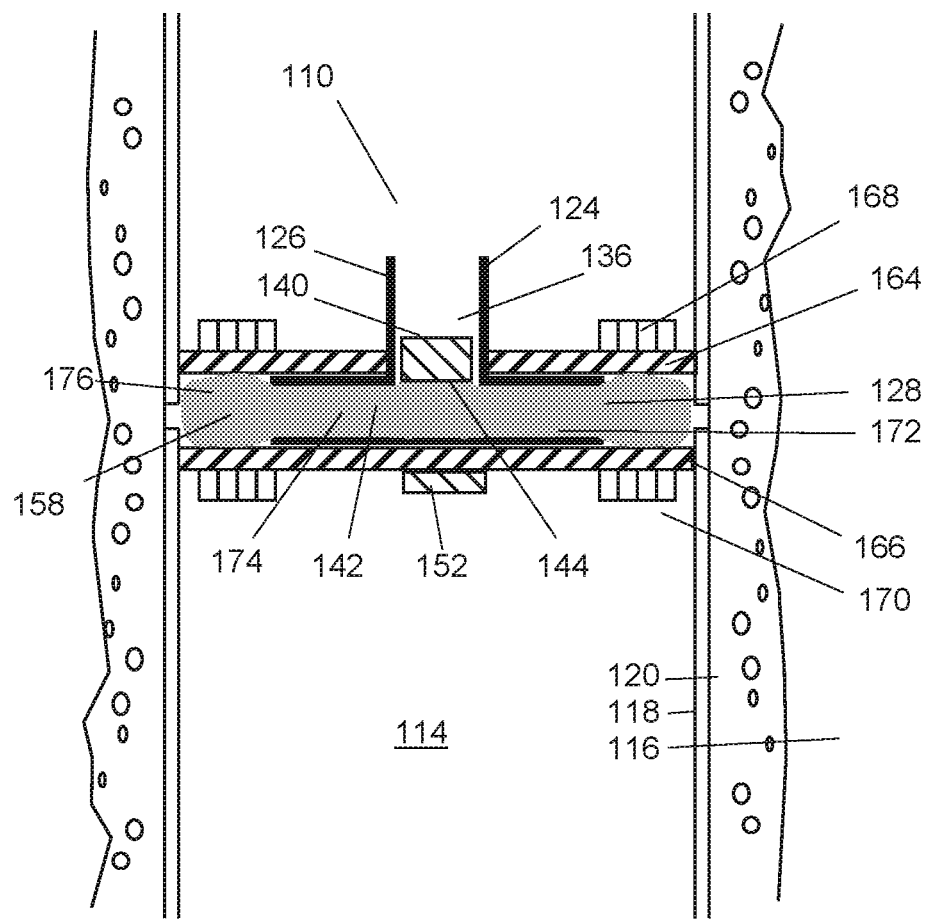
FIG. 12 is a schematic section of the tool FIG. 8 showing the stream of combustion products flowing towards the casing, post-cutting.

As shown in FIG. 12, once the casing 118 is pierced, the circuit through the casing 118 is broken and the control mechanism 152 switches off the magnets 168, 170 dispersing the stream of combustion products 158 and reducing further damage to the casing 118.

Various modifications and improvements may be made to the described embodiments without departing from the scope of the invention. For example, the single circumferential outlet could be a series of nozzles which, for example, can open and close due to the bimetallic nature of the material from which the nozzles are made.

The tool could operate in a multistage process, in a further embodiment. For example, at one location in a wellbore, a hole could be formed in the tubular to allow equalisation of pressure before a cut is made at a different location.

In another embodiment, the control mechanism could receive feedback that a first cut has been made, for example through a first tubular, allowing a parameter change which commences a second cut. For example, the first cut could be made relatively slowly through a first tubular due to a build up of pressure behind the first tubular, the second cut being performed on a second tubular more aggressively after the pressure is relieved.

In other embodiments, the tool may incorporate one or more bladders.

The tool may inflate the/each bladder such that it fills the space between the tool and the target(s) to be severed.

The bladder may be pressurised to an optimum pressure so the tool severs in optimum fire pressure conditions.

The tool may include a spacer between the tool and the target to be severed.

The tool may incorporate one of more bridge plugs.

The tool may set one or more bridge plugs and then move the cutting portion of the tool to the required location prior to severing operations commencing.

The tool may incorporate one or more packers or swellable packers.

Such packers or swellable packers can allow the tool to be centralized or off-set.

The packers or swellable packers can be set such that the tool is positioned in the optimal position for severing operations.

The packers or swellable packers may be operated hydraulically and/or using propellant.

The tool may sever through the packers or swellable packers.

The tool may place a suitable structure, made of a metal lattice, carbon-fibre lattice, neoprene, 3D-printed structure, glass structure etc., in the space between the tool and the target. Such structures may be pressurised or non-pressurised. Such structures may be expandable. The tool may sever through such structure.

The tool may isolate small sections of tubular.

The pressure within those sections may be bled off such that the pressure in those isolated sections is optimised for tool performance. The tool may carry out severing or precision cutting operations in those isolated sections.

The propellant may be provided in sealed units such as cartridges. These sealed units may incorporate pre-weakened areas that fracture at pre-set pressures.

Such areas may be made of suitable materials such as salt, glass, ceramic materials, metal, rubber, frozen material, squeezable material, a combination of materials etc.

Such pre-weakened areas may be pressure retaining and pressure sealing or incorporate features that make the propellant sealed units pressure retaining and pressure sealing.

Such pre-weakened areas may become the tool flow paths on activation of the tool.

The tool may include a cut verification system that can verify the cut and profile of the cut following operation of the tool.

The tool may incorporate a bottom plug and bottom plug setting system. This will allow the tool to set the bottom plug before commencing cutting operations.

The tool may move away from the bottom plug after the bottom plug has been set, to a location suitable or optimum for cutting operations.

The tool configuration may be optimised to either use or counter the effects of any thrust generated by the stream(s) of combustion products.

Particles may be sprayed in the stream of combustion products to wet an optimal area of the target.

Where the tool has a stack of propellant cartridges, the cartridges may be fired in sequence.

There may be coding and selection of the firing sequence.

The space between the tool and the target may be purged to optimise the conditions for severance.

In some embodiments, the control mechanism may be able to switch the tool on or off.

Where there are outlets particularly in the form of nozzles, the outlets may be replaceable. This feature gives additional utility to the tool as, for example, it allows an outlet or nozzle to be replaced due to erosion.

It may be possible in some embodiments to introduce particles of liquid or solid into the stream of combustion products.

The invention claimed is:

1. A tool for manipulating a target, the tool comprising:
   a housing defining a chamber, the chamber having an upper and lower outlet member defining an outlet opening therebetween;
   the lower outlet member comprising a series of movable overlapping petals;
   a propellant source comprising at least one propellant located within the chamber, wherein once ignited, the propellant burns to produce propellant gas;

an ignition mechanism for igniting the propellant source; and a control mechanism operable to control movement of the lower outlet member petals relative to the upper outlet member from a run-in configuration to a deployed configuration thereby controlling and varying the outlet opening;

in the deployed configuration the lower outlet member petals extend beyond a diameter described by the upper outlet member and the outlet opening is smaller than in the run-in configuration; and wherein upon ignition of the propellant source, the at least one propellant of the propellant source is operable to deflagrate, creating at least one stream of combustion products, the chamber directing the at least one stream of combustion products through the upper and lower outlet members towards the target adjacent to and spaced apart from the tool, at least one parameter of the at least one stream of combustion products being changeable after ignition of the propellant source by operation of the control mechanism to control a depth of penetration of the at least one stream of combustion products into the target, wherein the at least one parameter is energy and/or intensity of the at least one stream of combustion.

2. The tool of claim 1, wherein the control mechanism is operable during use of the tool to also control the content or structure of the at least one stream of combustion products.

3. The tool of claim 1, wherein the control mechanism is operable during use of the tool to also control the rate of burn of propellant or the volume of supply of propellant.

4. The tool of claim 1, wherein the control mechanism is operable during use of the tool to also control constituents of the propellant source.

5. The tool of claim 1, wherein the control mechanism is operable after ignition of the propellant source to move the lower outlet member to an outlet focused position in which the outlet channels the at least one stream of combustion products towards a particular location of the tool.

6. The tool of claim 1, wherein the control mechanism comprises at least one sensor.

7. The tool of claim 1, wherein the tool further comprises at least one modifying agent provided in or adjacent to the tool or generated by the tool.

8. The tool of claim 1, wherein the control mechanism is operable during use of the tool to dump or disperse the at least one stream of combustion products away from, or to minimise the effect of the stream on, the target.

9. The tool of claim 1, wherein the control mechanism is able to respond to multiple sensors during use of the tool.

10. The tool of claim 1, wherein the tool operates during the use of the tool in a multistage process.

11. The tool of claim 1, wherein the target is at least one of a tubular, a packer and a swellable packer.

12. The tool of claim 1, wherein the control mechanism is operable to vary the outlet opening while at least one stream of combustion products is being directed through the outlet opening.

13. A method of manipulating a downhole target, the method comprising the steps of:

disposing a tool adjacent to and spaced from the downhole target, the tool comprising a housing defining a chamber, the chamber having an upper and lower outlet member defining an outlet opening therebetween;

the lower outlet member comprising a series of movable overlapping petals;

a propellant source located comprising at least one propellant located within the chamber, wherein once ignited, the propellant burns to produce propellant gas;

an ignition mechanism for igniting the propellant source; and a control mechanism operable to control movement of the lower outlet member petals relative to the upper outlet member from a run-in configuration to a deployed configuration thereby controlling and varying the outlet opening;

in the deployed configuration the lower outlet member petals extend beyond a diameter described by the upper outlet member and the outlet opening is smaller than in the run-in configuration;

igniting the at least one propellant of the propellant source such that the propellant source deflagrates creating at least one stream of combustion products, the chamber directing the at least one stream of combustion products through the upper and lower outlet members towards the downhole target to be manipulated; and changing at least one parameter of the at least one stream of combustion products by use of the control mechanism to control a depth of penetration of the at least one stream of combustion products into the downhole target, wherein the at least one parameter is energy and/or intensity of the at least one stream of combustion.

14. The method of claim 13, wherein the downhole target is at least one of a tubular, a packer and a swellable packer.

15. The method of claim 13, wherein the control mechanism is operable to vary the outlet opening while at least one stream of combustion products is being directed through the outlet opening.

16. A tool for use in a downhole environment, the tool comprising:

a housing defining a chamber, the chamber having an upper and lower outlet member defining at least one outlet opening therebetween;

the lower outlet member comprising a series of movable overlapping petals;

a propellant source located comprising at least one propellant located within the chamber, wherein once ignited, the propellant burns to produce propellant gas;

an ignition mechanism for igniting the propellant source; and a control mechanism operable to control movement of the lower outlet member petals relative to the upper outlet member from a run-in configuration to a deployed configuration thereby controlling and varying the outlet opening;

in the deployed configuration the lower outlet member petals extend beyond a diameter described by the upper outlet member and the outlet opening is smaller than in the run-in configuration; and wherein upon ignition of the propellant source, the at least one propellant of the propellant source is operable to deflagrate, creating at least one stream of combustion products, the chamber directing the at least one stream of combustion products through the upper and lower outlet members towards a tubular target adjacent to and spaced apart from the tool, at least one parameter of the at least one stream of combustion products being changeable after ignition of the propellant source by the control mechanism to control a depth of penetration of the at least one stream of combustion products into the target, wherein the at least one parameter is energy of the at least one stream of combustion.

17. The tool of claim 16, wherein the control mechanism is operable during use of the tool to also control the content or structure of the at least one stream of combustion products.

18. The tool of claim 16, wherein the control mechanism is operable during use of the tool to also control the rate of burn of propellant or the volume of supply of propellant.

19. The tool of claim 16, wherein the control mechanism is operable during use of the tool to also control constituents of the propellant source.

20. The tool of claim 16, wherein the control mechanism is operable after ignition of the propellant source to move the lower outlet member to an outlet focused position in which the outlet channels the at least one stream of combustion products towards a particular location outwith the tool.

21. The tool of claim 16, wherein the control mechanism comprises at least one sensor.

22. The tool of claim 16, wherein the tool further comprises at least one modifying agent provided in or adjacent to the tool or generated by the tool.

23. The tool of claim 16, wherein the control mechanism is operable during use of the tool to dump or disperse the at least one stream of combustion products away from, or to minimise the effect of the stream on, the target.

24. The tool of claim 16, wherein the control mechanism is able to respond to multiple sensors during use of the tool.

25. The tool of claim 16, wherein the tool operates during the use of the tool in a multistage process.

26. The tool of claim 16, wherein the target is at least one of a tubular, a packer and a swellable packer.

27. The tool of claim 16, wherein the control mechanism is operable to vary the outlet opening while at least one stream of combustion products is being directed through the outlet opening.

28. A tool comprising:
a housing defining a chamber, the chamber having an upper and lower outlet member defining an outlet opening therebetween;
the lower outlet member comprising a series of movable overlapping petals;
a propellant source located comprising at least one propellant, which is an explosive material located within the chamber;
an ignition mechanism for igniting the propellant source; and
a control mechanism operable to control movement of the lower outlet member petals relative to the upper outlet member from a run-in configuration to a deployed configuration thereby controlling and varying the outlet opening;
in the deployed configuration the lower outlet member petals extend beyond a diameter described by the upper outlet member and the outlet opening is smaller than in the run-in configuration; and
wherein, upon ignition of the propellant source, the at least one propellant of the propellant source is operable to deflagrate, creating at least one stream of combustion products, the chamber directing the at least one stream of combustion products through the upper and lower outlet members, towards a target adjacent to and spaced apart from the tool, at least one parameter of the at least one stream of combustion products being changeable after ignition of the propellant source by the control mechanism to control a depth of penetration of the at least one stream of combustion products into the target, wherein the at least one parameter is energy of the at least one stream of combustion.

29. The tool of claim 1, wherein the petals are hingedly connected to a lower surface of the housing, wherein the lower outlet member petals are movable relative to the lower surface of the housing and the upper outlet member to vary the outlet opening between the run-in configuration and the deployed configuration.

* * * * *